United States Patent
Cho et al.

(10) Patent No.: US 10,402,386 B2
(45) Date of Patent: Sep. 3, 2019

(54) METHOD AND APPARATUS FOR GENERATING INDEX FOR ENCRYPTED FIELD IN DATABASE

(71) Applicant: FASOO.COM CO., LTD., Seoul (KR)

(72) Inventors: Kyu-Gon Cho, Goyang-si (KR); Oh-Seung Kwon, Seoul (KR)

(73) Assignee: Fasoo.com Co., Ltd., Seoul (KR)

( * ) Notice: Subject to any disclaimer, the term of this patent is extended or adjusted under 35 U.S.C. 154(b) by 553 days.

(21) Appl. No.: 15/026,395

(22) PCT Filed: Oct. 13, 2014

(86) PCT No.: PCT/KR2014/009572
§ 371 (c)(1),
(2) Date: Mar. 31, 2016

(87) PCT Pub. No.: WO2015/056939
PCT Pub. Date: Apr. 23, 2015

(65) Prior Publication Data
US 2016/0246828 A1    Aug. 25, 2016

(30) Foreign Application Priority Data

Oct. 14, 2013  (KR) .................. 10-2013-0122102

(51) Int. Cl.
*G06F 16/22* (2019.01)
*G06F 16/2457* (2019.01)
(Continued)

(52) U.S. Cl.
CPC ...... *G06F 16/2246* (2019.01); *G06F 16/2455* (2019.01); *G06F 16/24575* (2019.01); *G06F 21/602* (2013.01); *G06F 21/6227* (2013.01)

(58) Field of Classification Search
CPC .......... G06F 17/0327; G06F 17/30477; G06F 17/30528; G06F 16/2246; G06F 16/2455; G06F 16/24575
(Continued)

(56) References Cited

U.S. PATENT DOCUMENTS

| | | | |
|---|---|---|---|
| 2005/0147240 A1* | 7/2005 | Agrawal | G06F 21/60 380/28 |
| 2010/0169665 A1* | 7/2010 | Kang | G06F 17/30321 713/189 |
| 2012/0327450 A1* | 12/2012 | Sagan | G03G 21/046 358/1.14 |

FOREIGN PATENT DOCUMENTS

| | | |
|---|---|---|
| KR | 1019990066251 | 8/1999 |
| KR | 1020060094000 A | 8/2006 |

(Continued)

*Primary Examiner* — Kimberly L Wilson
(74) *Attorney, Agent, or Firm* — Daniel H. Sherr, Esq.

(57) ABSTRACT

The present invention relates to a method and an apparatus for generating an index for an encrypted field in order to protect private information in database. The method for generating the index for the encrypted field according to an embodiment of the present invention constructs an index as encrypted data itself without decrypting and storing contents of the encrypted field, constructs an index using distance information between encrypted data and a pre-configured reference value when the index is constructed, calculates a distance value from the reference value even when a search is performed, and performs a search by comparing the distance value with constructed index information table. In particular, when duplicated data exists, the present invention configures the duplicated data as a set of lower leaf nodes for a leaf node, thereby minimizing a search time.

12 Claims, 4 Drawing Sheets

(51) Int. Cl.
  *G06F 21/62* (2013.01)
  *G06F 21/60* (2013.01)
  *G06F 16/2455* (2019.01)
(58) Field of Classification Search
  USPC .......................................................... 707/743
  See application file for complete search history.

(56) References Cited

FOREIGN PATENT DOCUMENTS

| | | | |
|---|---|---|---|
| KR | 1020060121772 A | 11/2006 | |
| KR | 1020090118300 A | 11/2009 | |
| KR | 1020100002345 A | 1/2010 | |
| WO | 2015/056939 A1 | 4/2015 | |

\* cited by examiner

FIG. 2

ENCRYPTION

| ROW NUMBER | NAME | STUDENT NUMBER INFORMATION |
|---|---|---|
| L1 | KIL-DONG HONG | 19990002 |
| L2 | GAE-DDONG KIM | 19990005 |
| L3 | MOO-GAE AH | 19990001 |
| L4 | IN-NA YU | 19990007 |
| L5 | GA-RAM KIM | 19990003 |
| L6 | EUL-DONG LEE | 19990008 |
| L7 | SANG-SIL NA | 19990004 |
| L8 | KAP-DONG KIM | 19990006 |

(a)

| ROW NUMBER | NAME | STUDENT NUMBER INFORMATION |
|---|---|---|
| L1 | KIL-DONG HONG | AAXY |
| L2 | GAE-DDONG KIM | BXZQ |
| L3 | MOO-GAE AH | DYZX |
| L4 | IN-NA YU | JXGQ |
| L5 | GA-RAM KIM | EFDX |
| L6 | EUL-DONG LEE | FXUW |
| L7 | SANG-SIL NA | ZOXT |
| L8 | KAP-DONG KIM | CADB |

REFERENCE VALUE: 19990000

| ROW NUMBER | ENCRYPTED STUDENT NUMBER | DECRYPTED STUDENT NUMBER | DISTANCE VALUE |
|---|---|---|---|
| L1 | AAXY | 19990002 | 2 |
| L2 | BXZQ | 19990005 | 5 |
| L3 | DYZX | 19990001 | 1 |
| L4 | JXGQ | 19990007 | 7 |
| L5 | EFDX | 19990003 | 3 |
| L6 | FXUW | 19990008 | 8 |
| L7 | ZQXT | 19990004 | 4 |
| L8 | CADB | 19990006 | 6 |

(a)

SORTED BY DISTANCE VALUES ⇧

| ORDER | DISTANCE VALUE | ROW NUMBER |
|---|---|---|
| 1 | 1 | L3 |
| 2 | 2 | L1 |
| 3 | 3 | L5 |
| 4 | 4 | L7 |
| 5 | 5 | L2 |
| 6 | 6 | L8 |
| 7 | 7 | L4 |
| 8 | 8 | L6 |

(b)

METHOD AND APPARATUS FOR GENERATING INDEX FOR ENCRYPTED FIELD IN DATABASE

CROSS REFERENCE TO PRIOR APPLICATIONS

This application is a National Stage Patent Application of PCT International Patent Application No. PCT/KR2014/009572 filed on Oct. 13, 2014 under 35 U.S.C. 371, which claims priority under 35 U.S.C. 119 to Korean Patent Application No. 10-2013-0122102 filed on Oct. 14, 2013, which are all hereby incorporated by reference in their entirety.

TECHNICAL FIELD

The present disclosure relates to an apparatus and method of generating indexes for an encrypted field in a database, and more particularly to an apparatus and method of generating indexes for an encrypted field in a database for protection of privacy information, and an apparatus and method of searching data by using the generated indexes.

BACKGROUND ART

A database management system (DBMS) such as a database of Oracle provides various indexing techniques according to properties of data or searching in order to achieve fast searching of stored data. If the indexing technique is not used, all stored data values should be scanned in order to search the database for desired data. Thus, as the amount of data increases, a time required for the database search may increase in geometrical progression. Therefore, indexing techniques should be supported by DBMS for search of the great amount of data.

However, there is a problem that conventional indexing techniques supported by DBMS cannot properly operate with respect to encrypted data. Also, when databases such as Oracle or MS-SQL use encryption techniques provided by them, indexing techniques can also be applied to encrypted data. However, they cannot support various encryption techniques (e.g. ARIA, SEED, ASE, DES, etc.) suggested by the act on the protection of personal information. Meanwhile, some of DBMSs provide a function such as a function based index (FBI) in which encrypted data are decrypted and indexes are generated using the decrypted data. However, since such the method constructs indexes as not encrypted, there is a problem in which personal information may be exposed and thus the method cannot be used for protection of privacy information.

Therefore, in order to perform fast search of data in fields encrypted for protection a privacy information, since the data in the encrypted fields do not inherit an order of original data, a method of constructing indexes for encrypted fields based on decrypted data and a method of searching for encrypted data by using the constructed indexes of encrypted fields are necessarily required.

DISCLOSURE

Technical Problem

In order to resolve the above-described problem, the present invention is to provide an apparatus and method of constructing indexes for an encrypted field. In the apparatus and method, the encrypted field is decrypted, and indexes for the encrypted field are constructed without storing the decrypted content. Also, the apparatus and method can make it possible to search data by using the constructed indexes.

Technical Solution

In order to achieve the above-described purpose, a method of generating indexes on a field encrypted for protection of personal information in a database, according to an exemplary embodiment of the present invention, may comprise (a) reading encrypted data corresponding to the encrypted field from the data base; (b) extracting original data and position information within the encrypted field by decrypting the encrypted data; (c) generating a reference value; (d) calculating distance values between the original data and the reference value; (e) sorting the distance values according to magnitudes and signs of the distance values; and (f) generating an index information table in which the position information and the distance values are stored by matching the position information of the original data to the distance values.

Preferably, the method nay further comprise (g) when a search of target original data is needed, searching the database for the target original data by calculating an input distance value which is a distance between the target original data and the reference value, and comparing the input distance value with the distance values stored in the index information table.

Preferably, in the step (c), the reference value may be generated by using a random value.

Preferably, the method may further comprise, between the step (c) and the step (d), encrypting the reference value and storing the encrypted reference value.

Preferably, in the step (g), at least one of a B+ tree algorithm, a hash algorithm, and a bitmap algorithm may be used as an index search technique.

Preferably, the at least one of the B+ tree algorithm, the hash algorithm, and the bitmap algorithm may be performed using a tree structure comprising internal nodes including reference values for searching the target original data and leaf nodes including index information.

Preferably, when lower leaf nodes having different position information and redundant data exist, the lower leaf nodes having different position information and redundant data are grouped into a set whereby overhead can be minimized.

Preferably, lower leaf nodes having only position information may be generated to form a set, in a lower position of a leaf node among the lower leaf nodes having the redundant data.

Preferably, in the step (f), the index information table may be generated by using a user-defined indexing technique when the database provides the user-defined indexing technique, and the index information table is generated by using a user-defined function and a trigger when the database does not provide the user-defined indexing technique.

In order to achieve the above-described purpose, an apparatus of generating indexes on a field encrypted for protection of personal information in a database, according to an exemplary embodiment of the present invention, may comprise a reference value generating unit generating a reference value for calculating distance values of data to be indexed; a distance value calculating unit reading encrypted data of the encrypted field from a table, extracting original data and position information within the encrypted field by decrypting the encrypted data, and calculating distance values between the extracted original data and the reference value; and an index generating unit generating an index information table in which the position information and the distance values are stored by matching the position information of the original data to the distance values.

Preferably, the reference value generating unit may generate the reference value by generating a random value according to a maximum length and a type of the original data.

Preferably, the distance value calculating unit may calculate the distance values by calculating differences of the extracted original data from the reference value based on order information of a first character string of the original data When the original data are constructed as character strings.

Preferably, the distance value calculating unit may sort the distance values according to magnitudes and signs of the distance values.

Preferably, the method may further comprise a data searching unit calculating an input distance value which is a distance between target original data and the reference value, and searching for the target original data by comparing the input distance value with the distance values stored in the index information table.

Advantageous Effects

Using a method of generating indexes for encrypted fields in a database and searching the database based on the generated indexes according to the present invention, indexes can be constructed by using encrypted data as they are, and thus critical privacy information such as resident registration numbers can be protected effectively. Also, leaf nodes containing redundant data can be constructed as a set. Accordingly, overhead can reduced and a time required for database search can also be reduced.

DESCRIPTION OF DRAWINGS

FIG. 2 is a view illustrating a table comprising names and student number information of students, and a table in which the student number information are encrypted.

FIG. 3 is a view illustrating a table comprising distance values of encrypted student number information in the encrypted table of FIG. 2 from a reference value, which are calculated based on orders of the student number information, and a table in which the distance values are sorted.

BEST MODE

Figure 1:
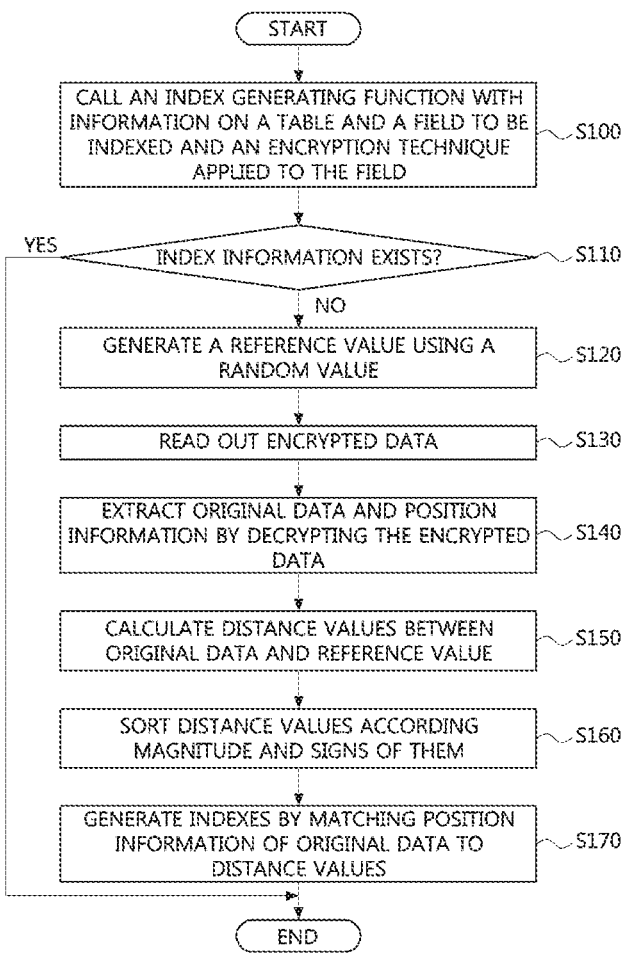
FIG. 1 is a flow chart illustrating a method of generating indexes for an encrypted field according to an exemplary embodiment of the present invention.

Hereinafter, preferred exemplary embodiments according to the present invention will be explained by referring to accompanying figures.

The exemplary embodiments which will be described below are presented as teaching examples. It will be understood by those skilled in the art that various changes in form and details may be made to the described embodiments without departing from the spirit and scope of the present invention.

The terms used herein are for purposes of illustrating and describing the inventive concept only and should not be construed to limit the meaning or the scope of the invention concept, As used in this specification, a singular form may, unless indicating a particular case in terms of the context, include a plural form. Also, the expressions "comprise" and/or "comprising" used in this specification neither define the mentioned shapes, numbers, steps, operations, members, elements, and/or groups of these, nor exclude the presence or addition of one or more other different shapes, numbers, steps, operations, members, elements, and/or groups of these, or addition of these. The term "and/or" used herein includes any and all combinations of one or more of the associated listed items.

As used herein, terms such as "first", "second", etc. are used to describe various members, components, regions, layers, and/or portions. However, it is obvious that members, components, regions, layers, and/or portions should not be defined by these terms. The terms do not mean a particular order, up and down, or superiority, and are used only for distinguishing one member, component, region, laver, or portion from another member, component, region, layer, or portion. Thus, a first member, component, region, layer, or portion which will be described may also refer to a second member, component, region, layer, or portion, without departing from the scope of the inventive concept.

Hereinafter, exemplary embodiments of the inventive concept will be described with reference to the attached drawings which schematically illustrate the embodiments of the inventive concept. In the drawings, for example, according to the manufacturing technology and/or tolerance, variations from the illustrated shape may be expected. Thus, the exemplary embodiments of the inventive concept must not be interpreted to be limited by a particular shape that is illustrated in the drawings and must include a change in the shape occurring, for example, during manufacturing.

FIG. 1 is a flow chart illustrating a method of generating indexes for an encrypted field according to an exemplary embodiment of the present invention.

Referring to FIG. 1, in order to generate indexes, the method of generating indexes for an encrypted field according to an exemplary embodiment of the present invention may execute an index generating function by transferring a table which is a target table for generating indexes, and property information of the table such as a name of the encrypted field and an encrypting technique applied to the encryption field (S100). Here, the method for generating indexes may vary according to the type of DBMS. This will be explained later.

Then, it may be identified whether index information exists in an index information table or not (S110). If the index information has been already constructed, it may be notified to a user that the index information has been already constructed, and the method for generating indexes may be finished. On the contrary, if the index information do not exist, a reference value for calculating distances of data to be indexed may be generated (S120). Here, the reference value may be generated by generating a random value with reference to a maximum length or a type of the original data. However, the reference value may be generated in various manners. Here, the reference value may be stored as encrypted for security.

After the reference value is generated, encrypted data of an encrypted field are read out from the index information table (S130). Here, the encrypted data may mean data such as resident. registration numbers, birth years, birth dates, etc. which are previously encrypted for protection of privacy information.

Then, original data including information on its position within the encrypted field (hereinafter, referred to as 'position information') are extracted by decrypting the encrypted data (S140). Here, the position information within the field may mean row numbers of the data in the corresponding field of the table. That is, when the original data are restored by decrypting the encrypted data, position information (e.g. row numbers in the corresponding filed, etc.) of the original data within the table may be stored together with the original data.

After the original data are extracted as described above, distance values of the original data are calculated (S150). For example, when the original data are constructed as character strings, differences from the reference value may be calculated as the distance values based on order information of the first character string (if the original data. As another example, the reference value may be constructed as a character string similar to a form of the original data, and the distance values may be calculated based on the order information by including both the original data and the reference value.

Then, the distance values may be sorted according to the magnitude and sign of them (S160). For example, the distance values may be configured as values of the reference value subtracted from order information of the original data. In this case, the distance values may be negative values, positive values, or zero. Here, if the distance value is a negative value, larger magnitude of the distance value may mean nearer distance from the reference value. On the contrary, if the distance value is a positive value, larger magnitude of the distance value may mean farther distance from the reference value. Of course, according to a direction of sorting, the result may be opposite.

After the distance values are sorted, the index information table may be generated by matching the position information of the original data to the corresponding distance values (S170). When it is needed to search the database for specific original data, an input distance value which is a distance between the specific original data and the reference value may be calculated, and the specific original data can be searched for by comparing the input distance value with the reference value stored in the index information table. Here, widely-used various techniques may be used as an index search method. For example, any one or combination of a B+ tree algorithm, a hash algorithm, and a bitmap algorithm may be used. The algorithms may use a tree structure which comprises internal nodes including reference values for searching desired search data and leaf nodes including index information. This will be explained later by referring to FIG. 4.

As described above, there may be DBMSs (e.g. Oracle) which provide a function of indexing to users and DBMSs (e.g. MS-SQL) which do not provide a function of indexing to users. Such the function may be referred to as a. user-defined indexing. In the Oracle DBMS, the function may be referred to as a 'domain indexing'.

In the case that a DBMS provides the user-defined indexing function, the DBMS may provide DDL statements (e.g. 'create index', 'drop index', 'alter index', etc.) used for the user to make indexes, change an index structure automatically when insertion, modification, or deletion of data in a table occurs, and provide a search function using the constructed user-defined indexes.

In the following description, explanation based on Oracle DBMS will be provided. As described above, the Oracle DBMS provides a user-defined indexing technique 'domain index'. According to the 'domain index' technique, an 'index type' may be defined and used. For example, a 'security index (SI) type (SI_index)' may be generated as follows.

<Create indextype SI_index for SI_eq(varchar2, varchar2) using SI_im;>

The 'SI_eq( )' is a search function for performing search by using the domain index (a plurality of necessary functions can be included here), and the 'SI$_{13}$ im' may indicate a portion of function constituting inside of the index. The skeleton functions constituting the inside may comprise created, drop( ) alter( ), insert( ), delete( ), update( ), truncate( ), etc. such that a developer producing the user-defined index can construct the inside.

Also, three skeleton functions such as indexstart( ) fetch( ), and close( ) are provided for use of the domain index, so that proper data results can be transferred through search of constructed indexes. Also, for example, indexes can be constructed as follows.

<Create index 'index name' on 'table name(field name)' indextype is SI_index;>

In the case of the DBMS providing the above-described user-defined indexing technique, the encryption indexing technique can be constructed according to the provided technique, and a function which can use the user-defined indexes may he constructed to perform search. For example, other information of a user whose resident registration number is '710005-1028933' can be searched as follows.

(Before encryption) <select * from table where jumin = '701005-1028933'>
(After encryption) <select * from table where SI_eq(jumin, '701005-1028933')=1>

Meanwhile, in the case of the DBMS which do not provide the user-defined indexing technique, the above-described method cannot be used. A user-defined function should be composed to generate, delete, and regenerate indexes. Also, since such the DBMS cannot automatically perform index processing when data are inserted, deleted, and modified in a table, a trigger should be configured in the corresponding table to perform index processing. Since a conventional method cannot be used for search of constructed indexes, 'sub-query' and 'in-query' should be used as follows.

(Before encryption) <select*from table where jumin='701005-1028933'>
(After encryption <select*from table where rowid in (select*from SI_eq(jumin, '701005-1028933')>

Here, 'rowid' may mean a record ID in the corresponding table. For the DBMS which does not support the 'rowid', a filed may be added as a record identifier field. Unique values in the field may be generated by using an increment constraint which automatically increases by 1 or time values in unit of micro-seconds.

Hereinafter, referring to FIGS. 2 to 4, a method for generating indexes and a method for searching data according to the present invention will be explained referring to actual exemplary tables.

FIG. 2 is a view illustrating a table comprising names and student number information of students, and a table in which the student number information are encrypted.

In (a) of FIG. 2, an original table including names and student number information of eight students is represented. However, since it is necessary not to expose the student number information for protection of privacy information, the student number information may be encrypted so as to construct a table represented as (b) of FIG. 2. If the table, (b) of FIG. 2, is constructed, a user can see only encrypted student number information, and thus the privacy information can be protected. However, if the encrypted student number information are sorted as they are, since the sorted result becomes different from order of the original data, the index information generated based on the sorted result of the encrypted student number information may become meaningless. Thus, as illustrated in FIG. 3, distance values of respective encrypted student number information from a predetermined reference value are calculated, and the rows of the table are sorted according to the calculated distance values.

In (a) of FIG. 3, encrypted student number information are decrypted, and distance values of them are calculated with respect to the reference value 19990000. For example, 'AAXY' is decrypted as 19990002, and its distance value may become 2 (i.e. 19990002−19990000=2). Also, 'ZOXT' is decrypted as 19990004, and its distance value may become 4 (i.e. 19990004−19990000=4).

Then, as shown in (b) of FIG. 3, the distance values may be sorted with respect. to magnitudes and signs of the distance values so that the distance values are listed in ascending order. In this instance, position information (row numbers) of the original data corresponding to the respective distance values are stored together as matched.

Once such the information are constructed, when specific original data are needed to be searched for, a distance value of the specific original data from the reference value can be calculated, and the original data can be searched with easiness by using the information.

Figure 4:
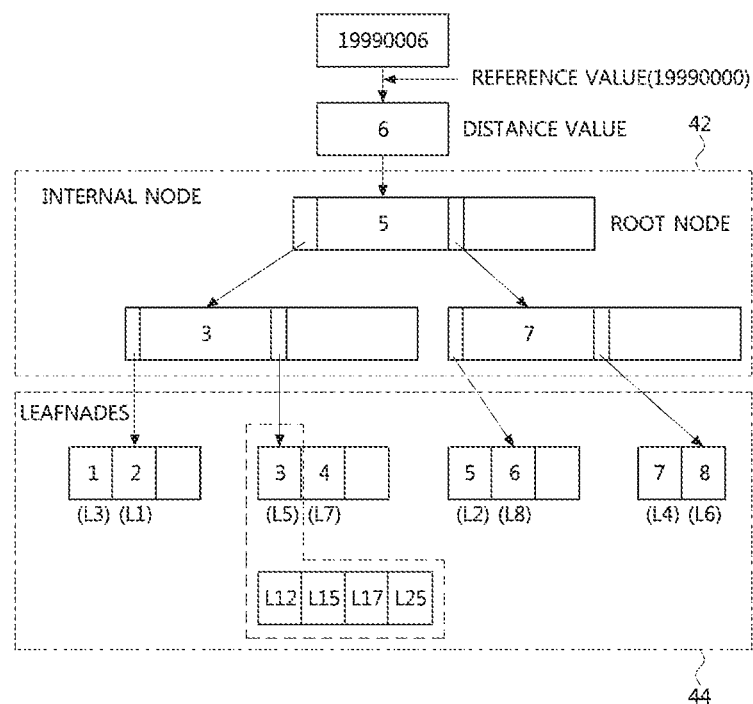
FIG. 4 is a view illustrating an index information table generated using a B+ tree algorithm based on the table information of FIG. 3.

FIG. 4 is a view illustrating an index information table generated using a B+ tree algorithm based on the table information of FIG. 3.

As shown in FIG. 4, the index information table using a B+ tree algorithm nay comprise internal nodes (e.g. 42) including a root node, and leaf nodes (e.g. 44). The internal nodes may be configured to comprise reference values used for searching for a desired value and pointers indicating lower nodes, and the leaf nodes may be configured to comprise actual data to be searched (e.g. values of the index information table). The leaf nodes may comprise bi-directional pointers, Using the bi-directional pointer, a next node can be easily searched.

Since the index information table, the internal nodes, and the leaf nodes are similar to those of the conventional method, explanation on them is omitted. Some new feature of leaf nodes, according to the present invention, will be explained later.

For example, in order to search the database for other information (e.g. name) on a student whose student number is '19990006' by using the index information table of FIG. 4, a distance value from a predetermined reference value (e.g. 19990000) may be calculated. The distance value becomes 6 (i.e. 19990006−19990000).

The input distance value 6 is compared with a value 5 of a root node. Since 6 is bigger than 5, a next search is forwarded to a right lower node. Then, the input distance value 6 is compared with a value 7 of the right lower node. Since 6 is smaller than 7, a next search is forwarded to a left lower node. Since the left lower node is a leaf node, it is determined whether the leaf node has a value of 6. In the leaf node, 6 is located in the second position, and position information 'L8' corresponding to the second position in the leaf node is extracted. Accordingly, using the position information 'L8', the user may identify that the name of the student is 'Kap-dong Kim' based on the table of FIG. 2.

Meanwhile, an algorithm used for processing redundant data, according to the present invention, is different from conventional algorithms.

When redundant data exist, the conventional algorithm should perform full-scan on leaf nodes to identify whether redundant data actually exist or not, since the leaf nodes located in a horizontal direction are configured to have redundant data. In order to overcome the above inefficiency the present invention may configure a set of lower leaf nodes having redundant data to be located in a lower position of the corresponding leaf node so that overhead can be minimized and performance of searching can be enhanced. That is, when '3' is searched in FIG. 4, if it is assumed that a plurality (e.g. 4) of redundant data (i.e. data having the same distance value 3) exist in addition to the 'L5', four leaf nodes may be located in a lower position of the node of '3', as a set indicated by a reference number 45.

According to the above tree structure, only the position information such as 'L12, L15, L17, and L25' may be included in the lower leaf nodes. This means that the lower leaf nodes grouped into a set do not have index information, When the lower leaf nodes are searched, information on them may be provided to the user together with the position information 'L5'. That is, when the user searches a student number 19990003, if index information is identified by using a distance value 3, the position information 'L12, L15, L17, and L25' may be also identified in a lump, According to the present invention, indexes can be constructed by using encrypted data of encrypted fields as they are, and search can be performed by using the indexes. Also, a set of lower leaf nodes may be constructed for redundant data so that efficiency of search cat be enhanced.

Figure 5:
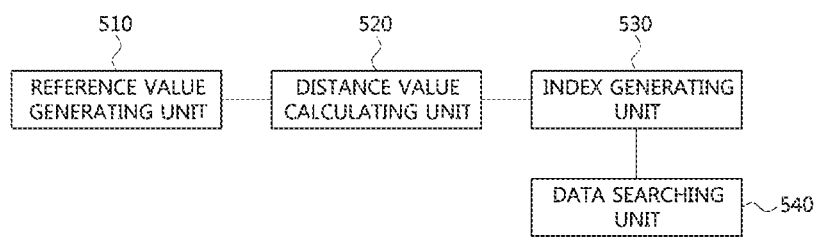
FIG. 5 is a block diagram illustrating a preferred exemplary embodiment of an apparatus of generating indexes for encrypted fields according to the present invention.

FIG. 5 is a block diagram illustrating a preferred exemplary embodiment of an apparatus of generating indexes for encrypted fields according to the present invention.

Referring to FIG. 5, a preferred exemplary embodiment of an apparatus for generating indexes of an encrypted field, according to the present invention, may comprise a reference value generating unit 510, a distance value calculating part 520, and an index generating unit 530.

The reference value generating unit 510 may generate a reference value used for calculating distance values of data to be indexed. Here, the reference value may be generated by using a random value according to the maximum length and type of original data. However, the reference value may be determined by using various manners. In this instance, the reference value may be stored as encrypted for security.

The distance value calculating unit 520 may read encrypted data of an encrypted field from a table, and extract original data and its position information within the encrypted field by decrypting the encrypted data, Here, the encrypted data may mean data such as resident registration numbers, birth year/date, etc. which are previously encrypted for protection of privacy information, and the position information within the field may mean row numbers of respective data in the encrypted field. Then, the distance value calculating unit 520 may calculate distance values between the extracted original data and the reference value. For example, when the original data are constructed as character strings, differences from the reference value may be calculated as the distance values based on order information of the first character string of the original data. As another example, the reference value may be constructed as a character string similar to a form of the original data, and the distance values may he calculated based on the order information by including both the original data and the reference value. Then, the distance value calculating unit 520 may sort the calculated distance values according to their magnitudes and signs (+,−). For example, the distance values may be configured as values of sequence information of the original data subtracted by the reference value. In this case, the distance values may be negative values, positive values, or 0. Here, if the distance value is a negative value, larger magnitude of the distance value may mean nearer distance from the reference value. On the contrary, if the distance value is a positive value, larger magnitude of the distance value may mean farther distance from the reference value, Of course, according to a direction of sorting, the result may be opposite.

The index generating unit 530 may generate an index information table by matching position information of the original data corresponding to the sorted distance values to the sorted distance values and storing the position information and the distance values. When it is needed to search specific original data based on the index information table, an input distance value which is a distance between the specific original data and the reference value is calculated, and the specific original data are searched by comparing the input distance value with distance values stored in the index information table. The data searching unit 540 may perform the above-described search of the specific original data by using the index information table.

While the present invention has been particularly shown and described with reference to preferred embodiments thereof, it should not be construed as being limited to the embodiments set forth herein. It will be understood by those skilled in the art that various changes in form and details may be made to the described embodiments without departing from the spirit and scope of the present invention as defined by the following claims.

The invention claimed is:

1. A method, performed by at least one processor, of generating indexes on a field encrypted for protection of personal information in a database, the method comprising:
   reading encrypted data corresponding to the encrypted field from the data base;
   extracting original data which has position information within the encrypted field by decrypting the encrypted data;
   generating a reference value;
   calculating distance values between the original data and the reference value;
   sorting the distance values according to magnitudes and signs of the distance values; and
   generating an index information table in which the position information and the distance values are stored by matching the position information of the original data to the distance values,
   wherein the generating the reference value comprises generating a random value according to a maximum length and a type of the original data.

2. The method according to claim 1, further comprising:
   when a search of target original data is needed, searching the database for the target original data by calculating an input distance value which is a distance between the target original data and the reference value, and comparing the input distance value with the distance values stored in the index information table.

3. The method according to claim 1, further comprising, between the generating the reference value and the calculating distance values, encrypting the reference value and storing the encrypted reference value.

4. The method according to claim 2, wherein the searching the database for the target original data comprises searching the database for the target original data uses at least one of a B+ tree algorithm, a hash algorithm, and a bitmap algorithm.

5. The method according to claim 4, wherein the at least one of the B+ tree algorithm, the hash algorithm, and the bitmap algorithm is performed using a tree structure comprising internal nodes including reference values for searching the target original data and leaf nodes including index information.

6. The method according to claim 5, wherein, when lower leaf nodes having different position information and redundant data exist, the lower leaf nodes having different position information and redundant data are grouped into a set so that overhead is minimized.

7. The method according to claim 6, wherein lower leaf nodes having only position information are generated to form a set, in a lower position of a leaf node among the lower leaf nodes having the redundant data.

8. The method according to claim 1, wherein the index information table is generated by using a user-defined indexing technique when the database provides the user-defined indexing technique, and the index information table is generated by using a user-defined function and a trigger when the database does not provide the user-defined indexing technique.

9. An apparatus of generating indexes on a field encrypted for protection of personal information in a database, the apparatus comprising:
   at least one hardware processor; and
   a memory storing instructions to cause the at least one hardware processor to perform:
      reading encrypted data corresponding to the encrypted field from the database;
      extracting original data which has position information within the encrypted field by decrypting the encrypted data;
      generating a reference value;
      calculating distance values between the original data and the reference value;
      sorting the distance values according to magnitudes and signs of the distance values; and
      generating an index information table in which the position information and the distance values are stored by matching the position information of the original data to the distance values, and
   wherein the generating the reference value comprises generating a random value according to a maximum length and a type of the original data.

10. The apparatus according to claim 9, wherein the calculating distance values comprises calculating the distance values by calculating differences between the reference value and the original data based on order information of a first character string of the original data when the original data are constructed as character strings.

11. The apparatus according to claim 9, wherein the calculating distance values comprises sorting the distance values according to magnitudes and signs of the distance values.

12. The apparatus according to claim 9, wherein the instructions cause the at least one hardware processor to further perform calculating an input distance value which is a distance between target original data and the reference value and searching for the target original data by comparing the input distance value with the distance values stored in the index information table.

* * * * *